US012625378B2

(12) United States Patent
Chang et al.

(10) Patent No.: US 12,625,378 B2
(45) Date of Patent: May 12, 2026

(54) HEAD MOUNTED DISPLAY DEVICE AND LIGHT-SHIELDING FACE MASK

(71) Applicant: HTC Corporation, Taoyuan City (TW)

(72) Inventors: Li-Hsun Chang, Taoyuan City (TW); Kuan-Ying Ou, Taoyuan City (TW); Chen-Fu Chang, Taoyuan City (TW); Chih-Hsiang Hsieh, Taoyuan City (TW); Yu-Hsun Chung, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 281 days.

(21) Appl. No.: 18/505,127

(22) Filed: Nov. 9, 2023

(65) Prior Publication Data

US 2024/0345405 A1 Oct. 17, 2024

Related U.S. Application Data

(60) Provisional application No. 63/458,900, filed on Apr. 12, 2023.

(51) Int. Cl.
*G02B 27/01* (2006.01)

(52) U.S. Cl.
CPC .............................. *G02B 27/0176* (2013.01)

(58) Field of Classification Search
CPC .................................................. G02B 27/0176
USPC ...................................... 359/477; 351/44, 46
See application file for complete search history.

(56) References Cited

U.S. PATENT DOCUMENTS

| | | | | |
|---|---|---|---|---|
| 99,136 | A | * | 1/1870 | Beckers ................. G02B 30/34 |
| | | | | 359/477 |
| 665,610 | A | * | 1/1901 | Leigh ..................... G02B 30/37 |
| | | | | 359/476 |
| 5,339,119 | A | * | 8/1994 | Gardner ................. G02C 11/00 |
| | | | | 351/44 |
| 2017/0017078 | A1 | * | 1/2017 | Tang ...................... G02B 5/003 |

(Continued)

FOREIGN PATENT DOCUMENTS

| | | | | |
|---|---|---|---|---|
| CN | 107422483 | A | * 12/2017 | ......... G02B 27/0176 |
| CN | 207396870 | | 5/2018 | |
| CN | 114153072 | | 3/2022 | |

(Continued)

OTHER PUBLICATIONS

"Office Action of Taiwan Counterpart Application", issued on Jan. 6, 2025, p. 1-p. 5.

(Continued)

*Primary Examiner* — George G. King
(74) *Attorney, Agent, or Firm* — JCIPRNET

(57) ABSTRACT

A head-mounted display device includes a front-end assembly, a wearing assembly and a light-shielding face mask. The wearing assembly is assembled to the front-end assembly to position the front-end assembly on a user's face. The light-shielding face mask includes a frame and a cover. The frame is connected to the front-end assembly. The cover is flexible and connected to the frame to cover the user's eyes. The cover has a forehead portion corresponding to the user's forehead and a pair of eye tail portions respectively corresponding to a pair of eye tails of the user. The forehead portion pushed by the user's forehead drives the pair of eye tail portions to approach the pair of eye tails of the user respectively.

16 Claims, 9 Drawing Sheets

(56)                    References Cited

U.S. PATENT DOCUMENTS

2021/0349322  A1     11/2021  Harris et al.
2022/0075198  A1      3/2022  Li et al.

FOREIGN PATENT DOCUMENTS

TW         201807460       3/2018
TW         202210906       3/2022

OTHER PUBLICATIONS

ROADTOVR, "HTC Vive Pro 2 Review—"Pro" Price with Not Quite Pro Performance", retrieved from https://www.roadtovr.com/htc-vive-pro-2-review/.

* cited by examiner

HEAD MOUNTED DISPLAY DEVICE AND LIGHT-SHIELDING FACE MASK

CROSS-REFERENCE TO RELATED APPLICATION

This application claims the priority benefit of U.S. provisional application Ser. No. 63/458,900, filed on Apr. 12, 2023. The entirety of the above-mentioned patent application is hereby incorporated by reference herein and made a part of this specification.

BACKGROUND

Technical Field

The application relates to a display device, and in particular, to a head mounted display device and a light-shielding face mask thereof.

Description of Related Art

The most common type of display device currently used for virtual reality is a head mounted display device. The head mounted display device requires appropriate a face mask to block light to prevent light leakage from affecting visual performance. In order to meet the head sizes of different users and the users' needs for wearing glasses, the light-shielding face mask needs to be designed in multiple sizes.

SUMMARY

The application provides ahead mounted display device whose light-shielding face mask itself can automatically adapt to the size of the user's head to cover the user's eyes.

The application provides a light-shielding face mask adapted for a head-mounted display device, which can automatically adapt to the size of the user's head to cover the user's eyes.

The head-mounted display device of the application includes a front-end assembly, a wearing assembly and a light-shielding mask. The wearing assembly is assembled to the front-end assembly to position the front-end assembly on a user's face. The light-shielding mask includes a frame and a cover. The frame is connected to the front-end assembly. The cover is flexible and connected to the frame to cover the user's eyes. The cover has a forehead portion corresponding to the user's forehead and a pair of eye tail portions respectively corresponding to a pair of eye tails of the user. The forehead portion pushed by the user's forehead drives the pair of eye tail portions to approach the pair of eye tails of the user respectively.

The light-shielding face mask of the application is adapted for a head-mounted display device. The head-mounted display device includes a front-end assembly, a wearing assembly and a light-shielding mask. The wearing assembly is assembled to the front-end assembly to position the front-end assembly on a user's face. The light-shielding mask includes a frame and a cover. The frame is connected to the front-end assembly. The cover is flexible and connected to the frame to cover the user's eyes. The cover has a forehead portion corresponding to the user's forehead and a pair of eye tail portions respectively corresponding to a pair of eye tails of the user. The forehead portion pushed by the user's forehead drives the pair of eye tail portions to approach the pair of eye tails of the user respectively.

Based on above, in the application, the forehead portion pushed by the user's forehead can drive the pair of eye tail portions close to the pair of eye tails of the user respectively, so that the cover itself can automatically adapt to the size of the user's head to cover the user's eyes.

DESCRIPTION OF THE EMBODIMENTS

Figure 1:
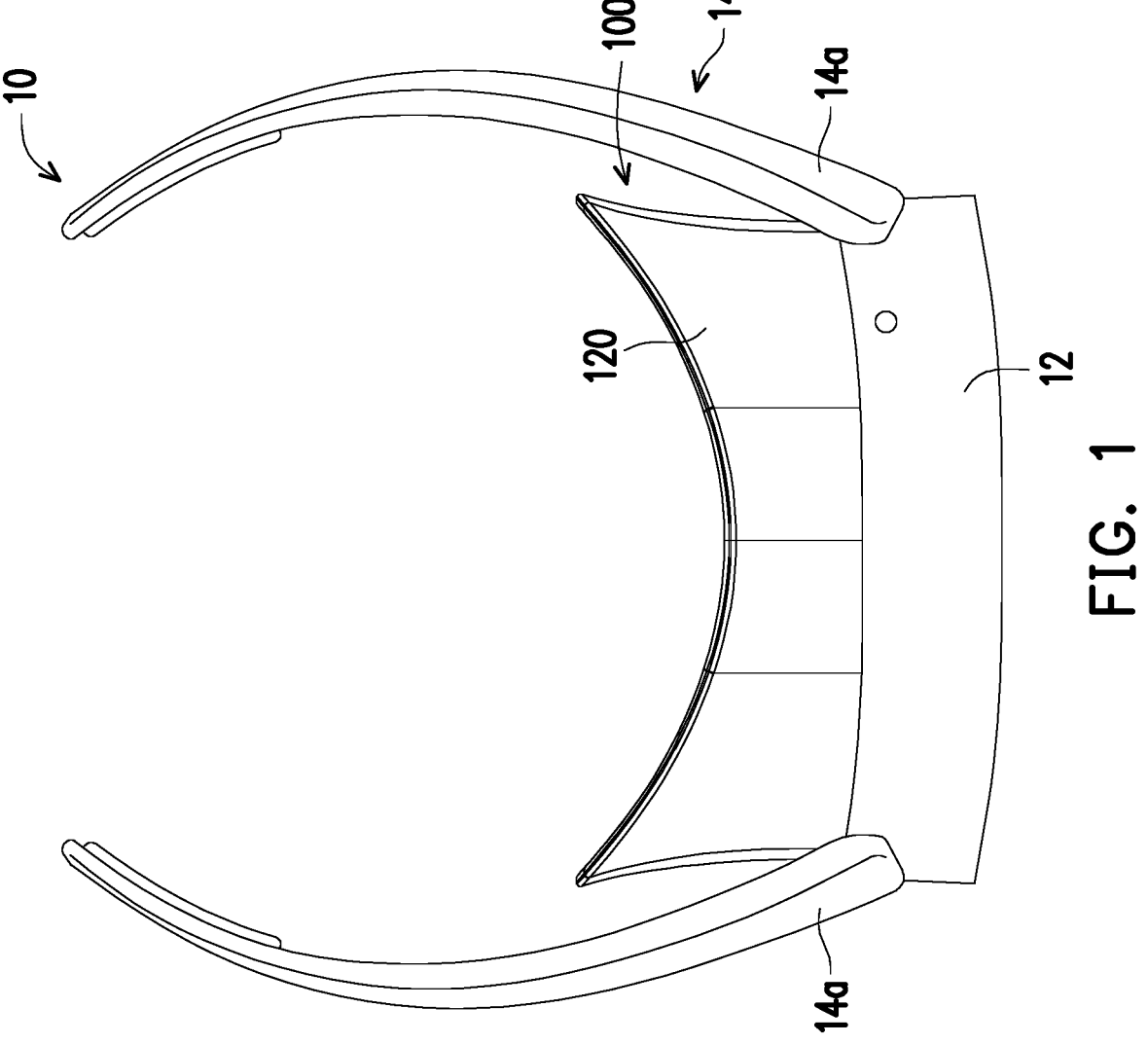
FIG. 1 is a top view of a head-mounted display device according to an embodiment of the present invention.

Referring to FIG. 1, in an embodiment of the present invention, the head-mounted display device 10 includes a front-end assembly 12. The front-end assembly 12 may include components such as an optical system (not shown) and a protective housing, and may be provided with a display or be suitable for placing a display. The aforementioned display can be a built-in display or an external portable display (such as a smartphone, etc.), but is not limited thereto. The type of the aforementioned display can be adjusted according to the application of the head-mounted display device 10 in a virtual reality system, augmented reality system or mixed reality system. The optical system includes optical elements used to change a light path of the display, such as lenses, light guides, or prisms, etc.

In the embodiment, the head-mounted display device 10 further includes a wearing assembly 14. The wearing assembly 14 is connected to the front-end assembly 12 to position the front-end assembly 12 to the user's face. The wearing assembly 14 may be a pair of temples 14a, which are respectively connected to both ends of the front-end assembly 12 and can be folded, but is not limited thereto. The wearing assembly 14 may also be other types of wearing assembly, such as a headband wearing assembly.

Figure 2:
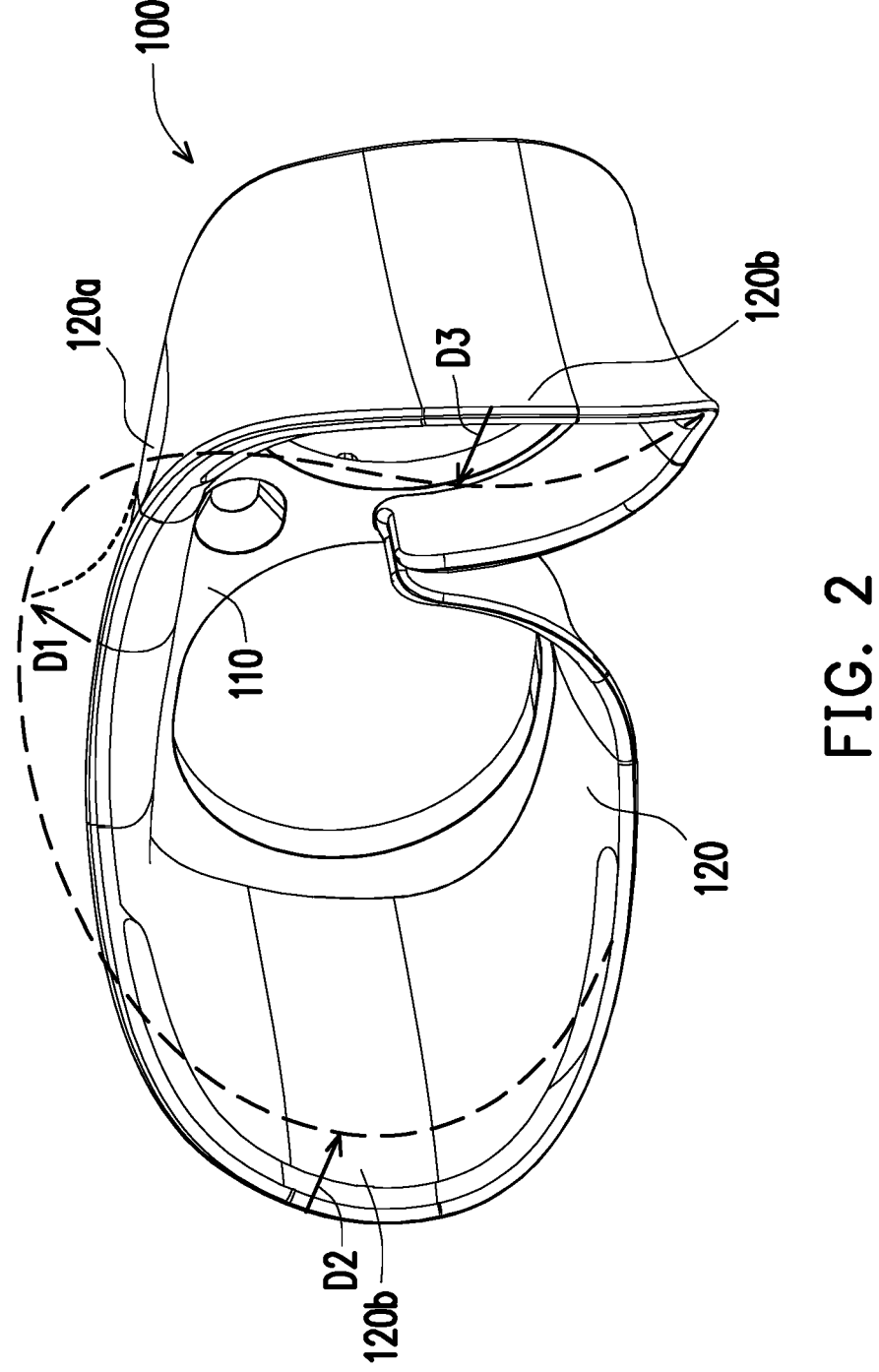
FIG. 2 is a rear perspective view of the light-shielding face mask of FIG. 1.
Figure 3:
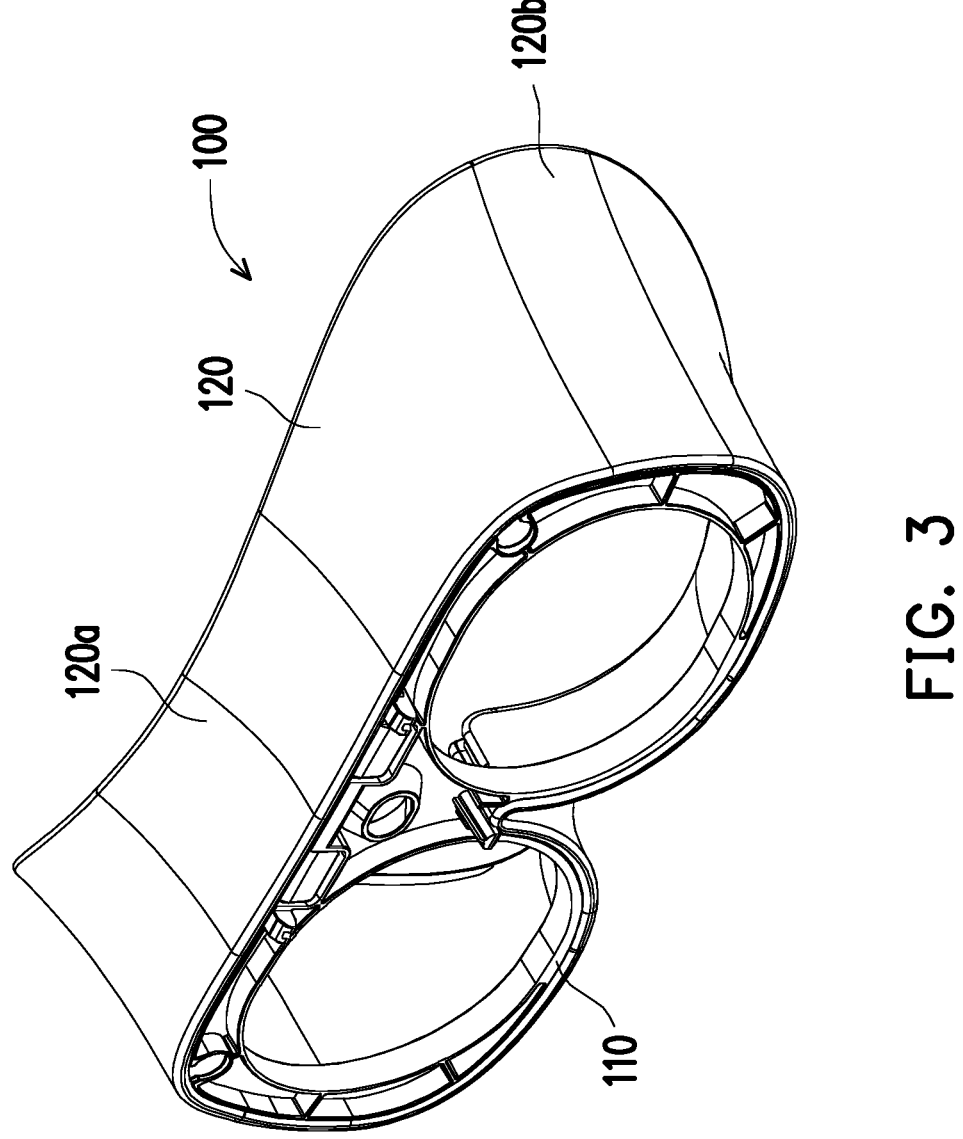
FIG. 3 is a front perspective view of the light-shielding face mask of FIG. 1.

Referring to FIG. 2 and FIG. 3, in the embodiment, the head-mounted display device 10 further includes a light-shielding face mask 100. The light-shielding face mask 100 includes a frame 110 and a cover 120. The frame 110 is assembled to the front-end assembly 12. The cover 120 is flexible and connected to the frame 110 to cover the user's eyes. The cover 120 has a forehead portion 120a corresponding to the user's forehead and a pair of eye tail portions 120b respectively corresponding to a pair of eye tails of the user. the forehead portion 120a pushed by the user's forehead drives the pair of eye tail portions 120b to approach the pair of eye tails of the user respectively, as shown in FIG. 2.

Specifically, when the forehead portion 120a is moved by the user's forehead along a direction D1, the pair of eye tail portions 120b is driven by the forehead portion 120a and moves toward the pair of eye tails of the user along a direction D2 and a direction D3 respectively. In FIG. 2, the dotted line represents the changing state of the forehead portion 120a after being pushed upward, and the broken line represents the changing state of the root (or rear peripheral edge) of the cover 120 after the forehead portion 120a is pushed upward.

Figure 4:
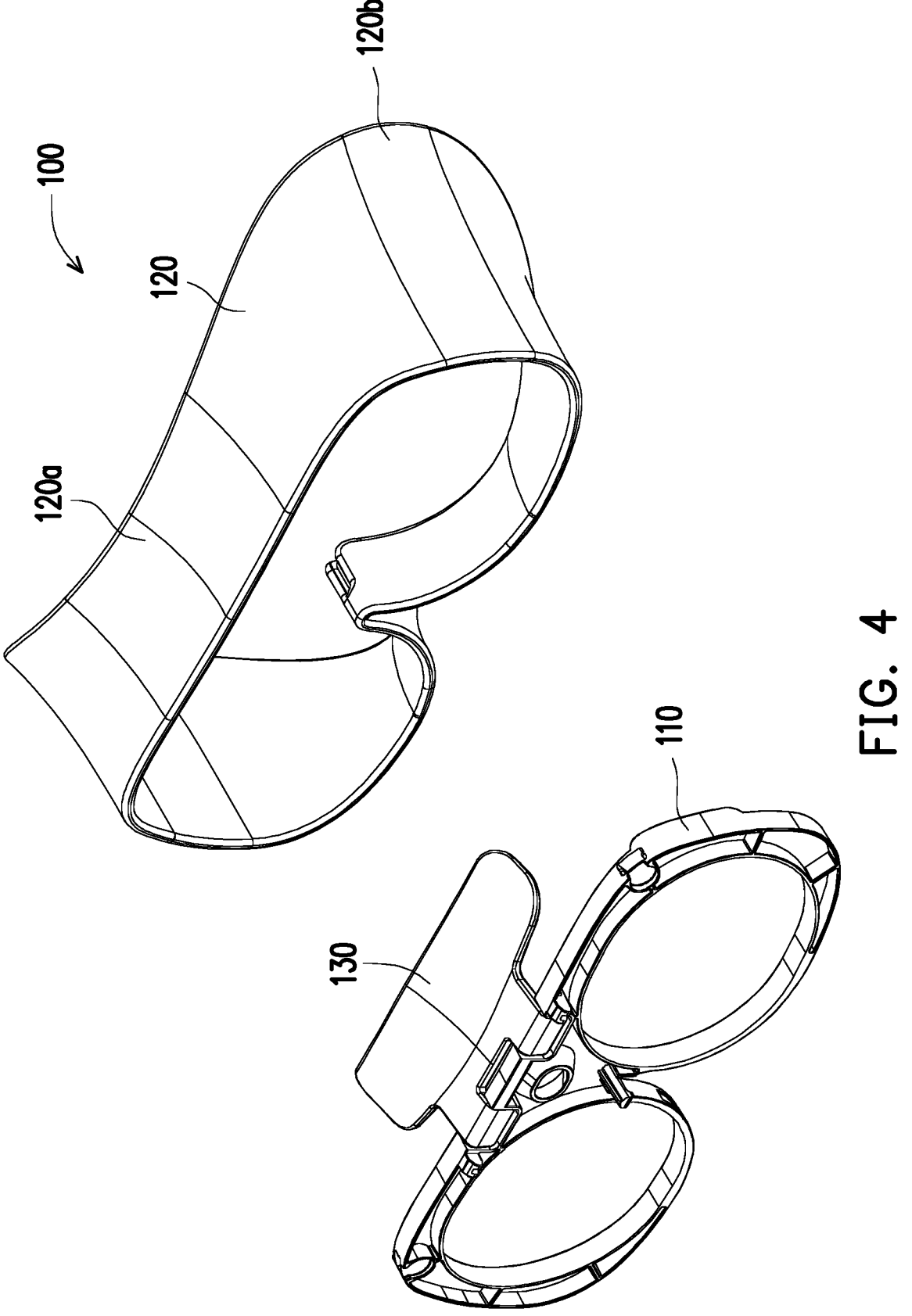
FIG. 4 is an exploded view of the light-shielding face mask of FIG. 3.

Referring to FIG. 3 and FIG. 4, in the embodiment, the light-shielding face mask 100 may further include a forehead support piece 130. The forehead support piece 130 is connected to the frame 110 and is adapted to press against the user's forehead to elastically limit a distance of the user's forehead relative to the frame 110. When a user who already wears glasses (such as myopia glasses) wears the head-mounted display device 10 of FIG. 1 on his or her face, the forehead support piece 130 can prevent the user's glasses from reaching the frame 110. In the embodiment, the cover 120 can cover the forehead support piece 130 to prevent the forehead support piece 130 from directly contacting the user's forehead. The material of the frame 110 and the forehead support piece 130 is, for example, plastic, and the material of the cover 120 is, for example, cloth.

Figure 5:
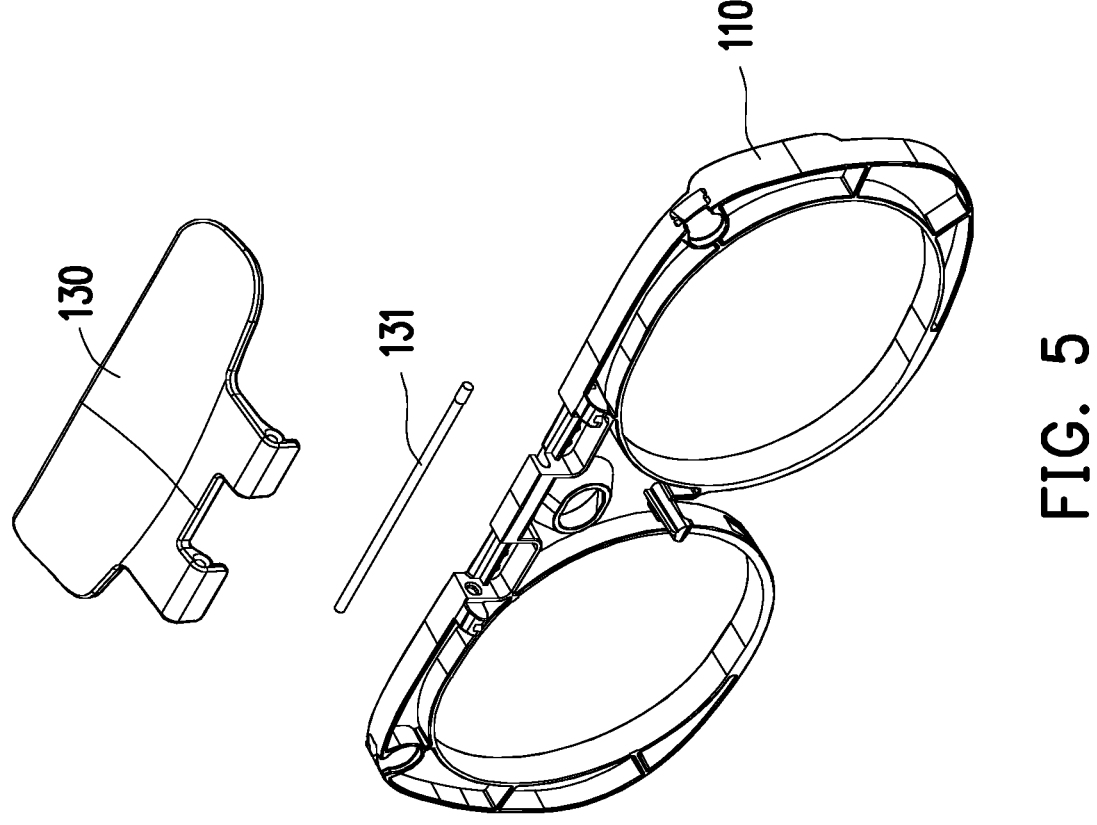
FIG. 5 is an exploded view of the frame and the forehead support piece of FIG. 4.

Referring to FIG. 4 and FIG. 5, in the embodiment, the forehead support piece 130 can be pivoted to the frame 110 with a limited pivot angle. Specifically, the forehead support piece 130 can be pivoted to the frame 110 via a pivot 131. And the pivot angle of the forehead support piece 130 relative to the frame 110 can be limited by forming stop blocks or stop surfaces on the forehead support piece 130 and the frame 110, thereby limiting the forehead support piece 130 from flipping from the rear of the frame 110 to the front of the frame 110.

Figure 6:
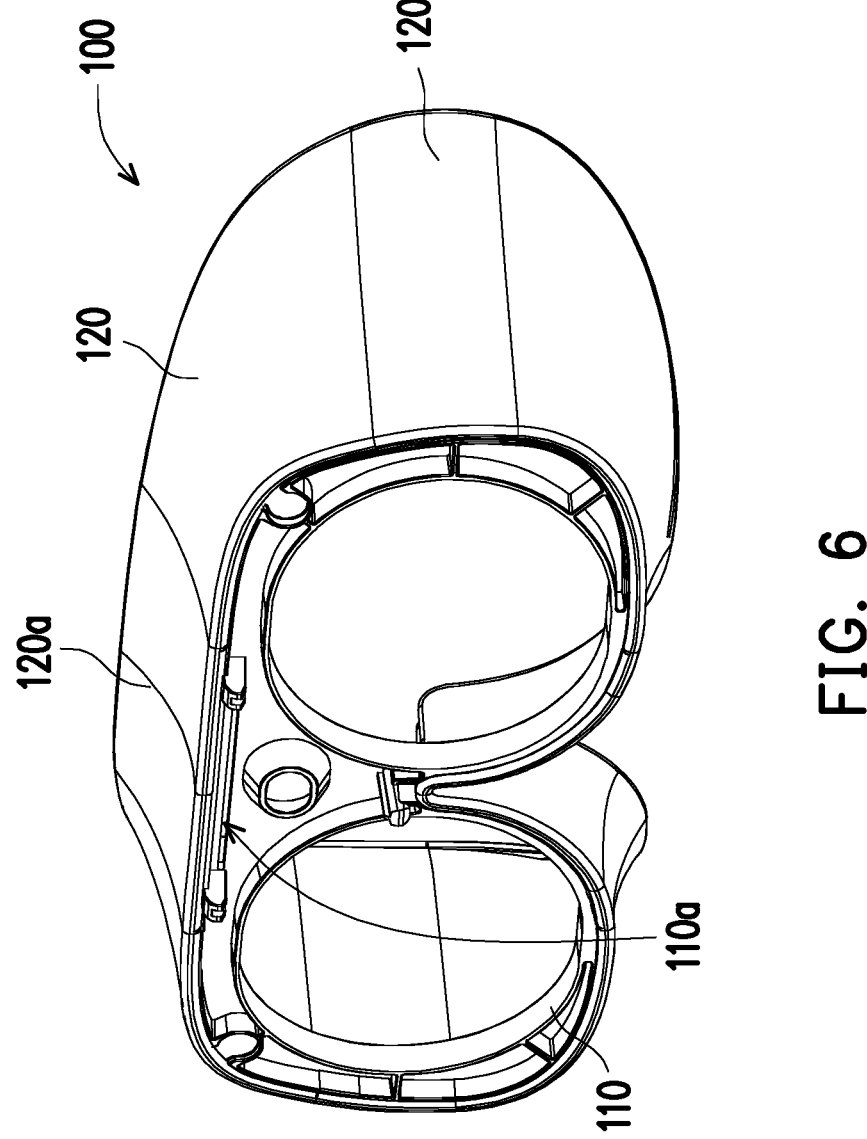
FIG. 6 is a front perspective view of a light-shielding face mask according to another embodiment of the present invention.
Figure 7:
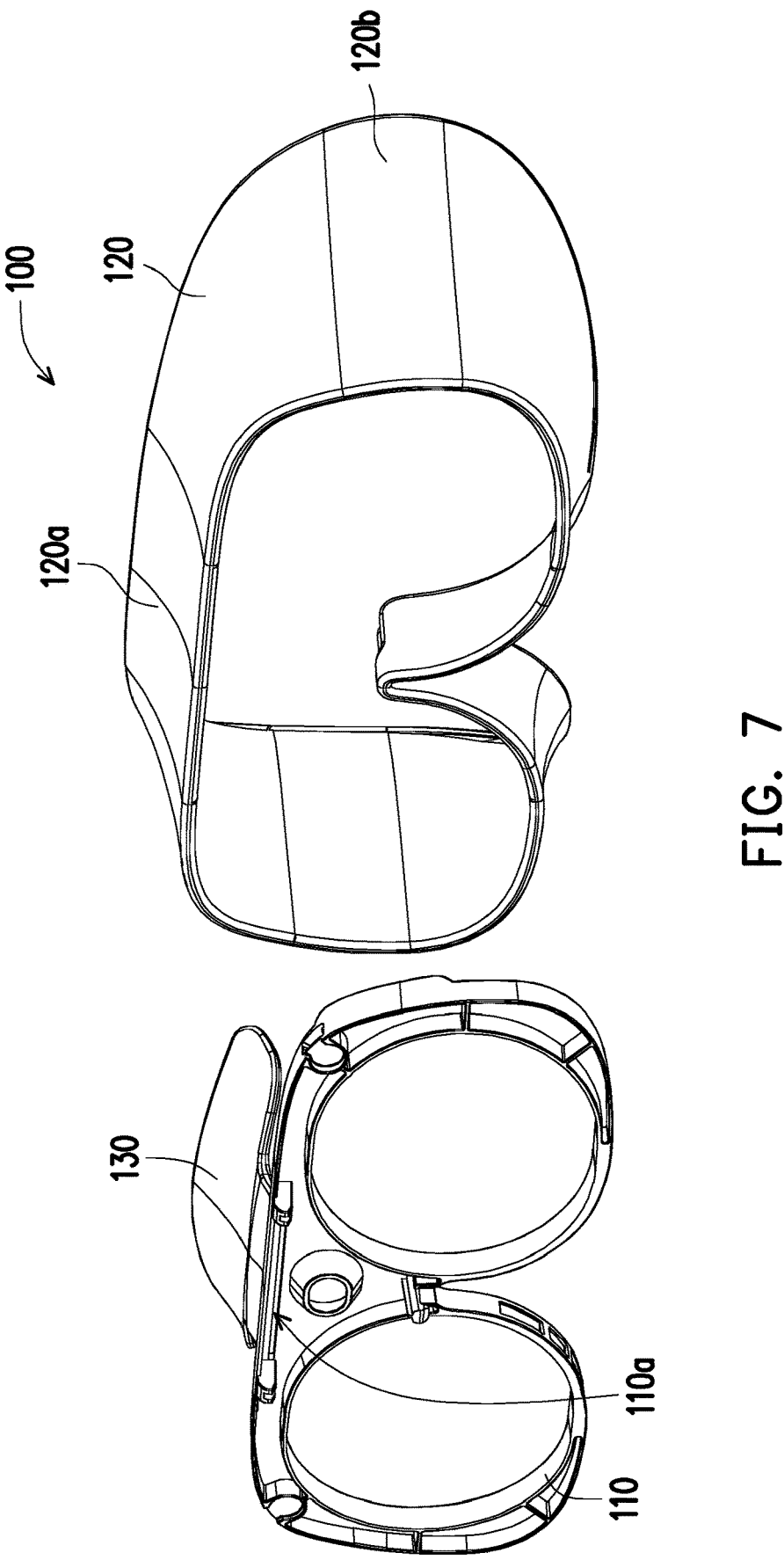
FIG. 7 is an exploded view of the frame and the forehead support piece of FIG. 6.

Referring to FIG. 6 and FIG. 7, compared with the embodiments of FIG. 3 to FIG. 5, the forehead support piece 130 of the light-shielding face mask 100 of the embodiments of FIG. 6 and FIG. 7 is integrated with the frame 110. In other words, during manufacture, the forehead support piece 130 and the frame 110 can be made into a single part, where a part of the single part forms the frame 110, and another part of the single part forms the forehead support piece 130. The material of the frame 110 and the forehead support piece 130 is, for example, plastic.

Referring to FIG. 6 and FIG. 7, the connection between the forehead support piece 130 and the frame 110 may have a weakened structure 110a, which is used to reduce the rigidity of the connection between the forehead support piece 130 and the frame 110, causing the forehead support piece 130 to elastically deform and rotate relative to the frame 110 under the push of the user's forehead. In the embodiment, the weakened structure 110a may be a long and narrow hole, and is located at the part where the frame 110 and the forehead support piece 130 are connected.

Figure 8:
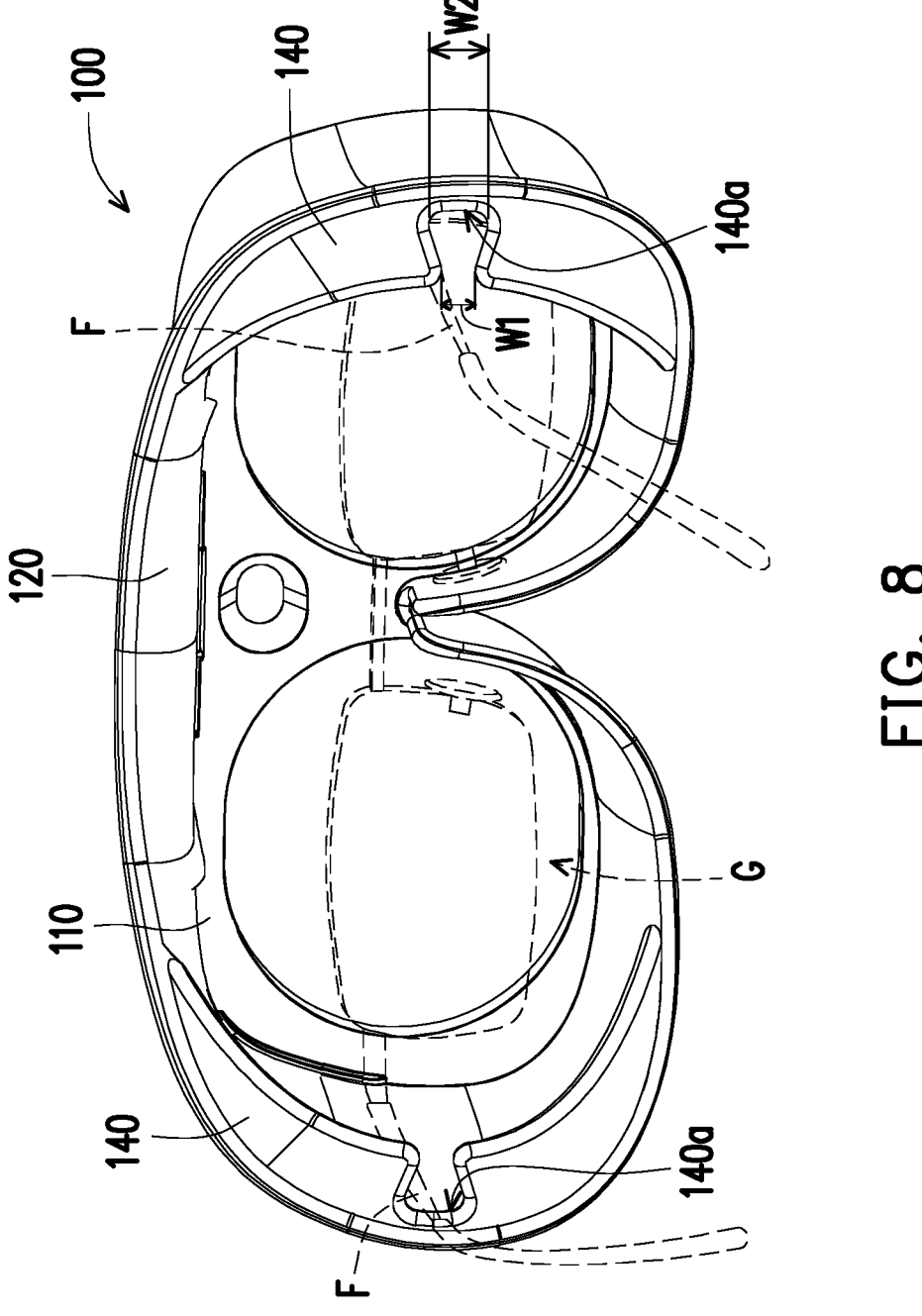
FIG. 8 is a rear perspective view of a light-shielding face mask according to another embodiment of the present invention.
Figure 9:
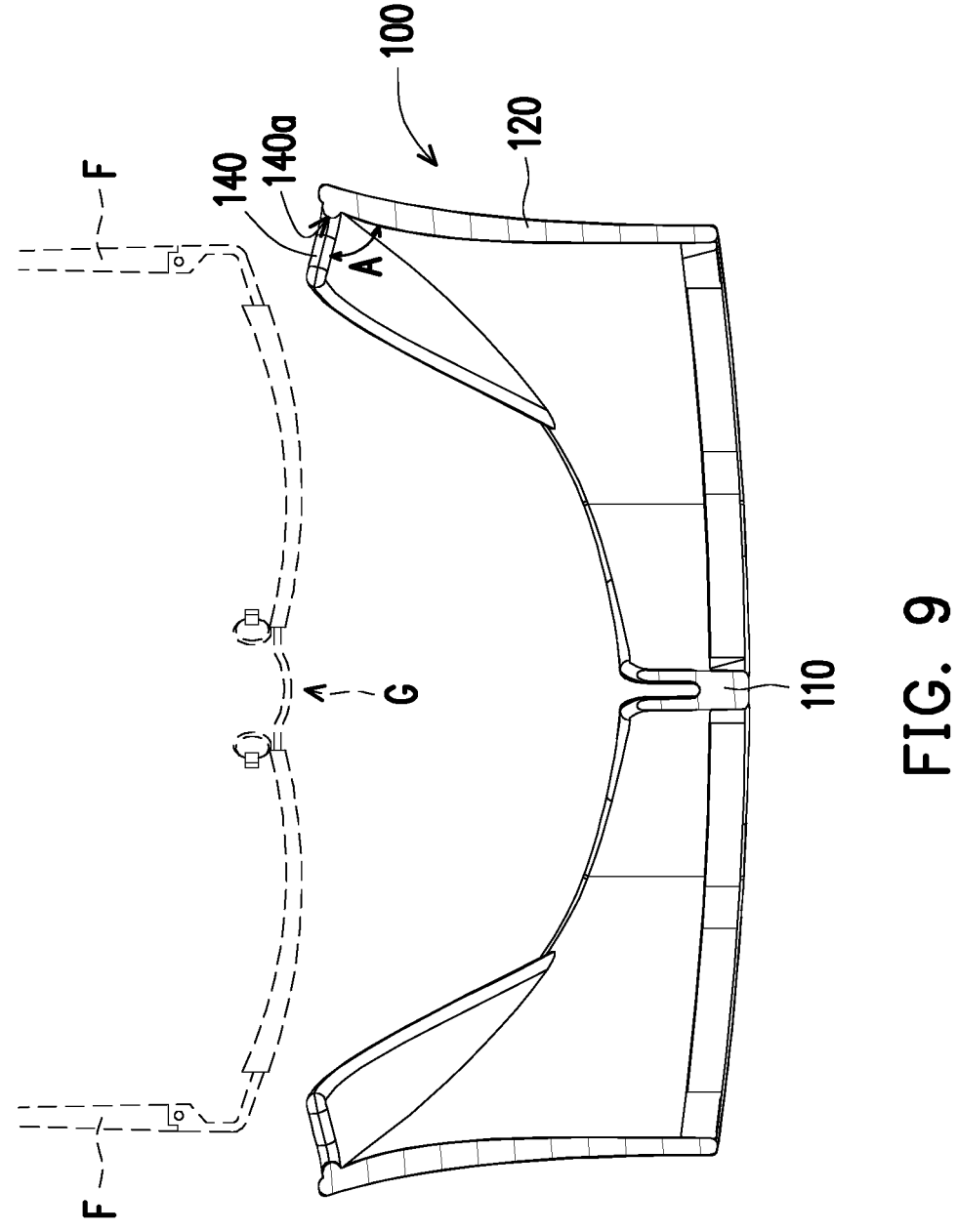
FIG. 9 is a cross-sectional view of the light-shielding face mask of FIG. 8.

Referring to FIG. 8 and FIG. 9, compared with the embodiment of FIG. 2, the light-shielding face mask 100 of the embodiments of FIG. 8 and FIG. 9 may further include a pair of lateral masks 140. The pair of lateral masks 140 are flexible and connected to edges on both sides of the cover 120 to assist in covering the user's eyes. In the embodiment, an angle A between each of the pair of lateral masks 140 and the cover 120 may be greater than 90 degrees, as shown in FIG. 9. Besides, in the embodiment, each of the pair of lateral masks 140 may have a hole 140a to allow the temples F of glasses G worn by the user to pass through. A width W1 of the end of the hole 140a relatively far away from the edge of the cover 120 is not greater than a width W2 of the end of the hole 140a relatively close to the cover 120.

In prior art, when the head-mounted display device has a function of adjusting the vision degree, the light-shielding face mask of the head-mounted display device can be designed to be narrower. However, in the case where the user needs to wear glasses to use the head-mounted display device, the light-shielding face mask of the head-mounted display device still needs to be designed wider to accommodate the glasses worn by the user. As a result, the light-shielding face mask looks large.

In the application, when the head-mounted display device is worn on the user's head, the forehead portion pushed by the user's forehead drives the pair of eye tail portions to approach the pair of eye tails of the user respectively, so that the cover itself can automatically adapt to the user's head size to cover the user's eyes to achieve a perfect fit effect and improve the problem of light leakage. In the case where the user needs to wear glasses to use the head-mounted display device, when the head-mounted display device is removed from the user's head, the forehead portion also returns to its original position. And the width of the cover has also returned to its original larger state to prevent the cover from catching on the glasses when the user wears glasses. Therefore, when the user needs to wear glasses to use the head-mounted display device, the light-shielding face mask of the head-mounted display device of the present application can still be designed to be narrower regardless of whether it has the function of adjusting the vision degree.

In addition, the light-shielding face mask may have the forehead support piece to press against the user's forehead to elastically limit the distance of the user's forehead relative to the frame. Besides, the light-shielding face mask may have the lateral masks on the sides of the cover to assist in covering the user's eyes. The lateral masks may have the hole to allow the temples of glasses worn by the user to pass through.

What is claimed is:

1. A head-mounted display device, comprising:
a front-end assembly;
a wearing assembly, assembled to the front-end assembly to position the front-end assembly on a user's face; and
a light-shielding face mask, comprising:
a frame, connected to the front-end assembly;
a cover, being flexible and connected to the frame to cover the user's eyes, wherein the cover has a forehead portion corresponding to the user's forehead and a pair of eye tail portions respectively corresponding to a pair of eye tails of the user, and the forehead portion pushed by the user's forehead drives the pair of eye tail portions to approach the pair of eye tails of the user respectively; and
a forehead support piece, connected to the frame, adapted to press against the user's forehead and elastically deform to limit a distance of the user's forehead relative to the frame, wherein the cover covers the forehead support piece.

2. The head-mounted display device according to claim 1 wherein the forehead support piece is pivoted to the frame with a limited pivot angle.

3. The head-mounted display device according to claim 1, wherein the forehead support piece is integrated with the frame.

4. The head-mounted display device according to claim 3, wherein the connection between the forehead support piece and the frame has a weakened structure, allowing the forehead support piece to elastically deform and rotate relative to the frame when pushed by the user's forehead.

5. The head-mounted display device according to claim 1, wherein the light-shielding face mask further comprises:

a pair of lateral masks, are flexible and connected to edges on both sides of the cover to assist in covering the user's eyes.

6. The head-mounted display device according to claim 5, wherein an angle between each of the pair of lateral masks and the cover is greater than 90 degrees.

7. The head-mounted display device according to claim 5, wherein each of the pair of lateral masks has a hole to allow the temples of glasses worn by the user to pass through.

8. The head-mounted display device according to claim 7, wherein a width of the end of the hole relatively far away from the edge of the cover is not greater than a width of the end of the hole relatively close to the cover.

9. A light-shielding face mask, adapted for a head-mounted display device, the head-mounted display device includes a front-end assembly and a wearing assembly, the wearing assembly is assembled to the front-end assembly to position the front-end assembly on an user's face, the light-shielding face mask comprising:

a frame, adapted for assembly to the front-end assembly;

a cover, being flexible and connected to the frame to cover the user's eyes, wherein the cover has a forehead portion corresponding to the user's forehead and a pair of eye tail portions respectively corresponding to a pair of eye tails of the user, and the forehead portion pushed by the user's forehead drives the pair of eye tail portions to approach the pair of eye tails of the user respectively; and a forehead support piece, connected to the frame, adapted to press against the user's forehead and elastically deform to limit a distance of the user's forehead relative to the frame, wherein the cover covers the forehead support piece.

10. The light-shielding face mask according to claim 9, wherein the forehead support piece is pivoted to the frame with a limited pivot angle.

11. The light-shielding face mask according to claim 9, wherein the forehead support piece is integrated with the frame.

12. The light-shielding face mask according to claim 11, wherein the connection between the forehead support piece and the frame has a weakened structure, allowing the forehead support piece to elastically deform and rotate relative to the frame when pushed by the user's forehead.

13. The light-shielding face mask according to claim 9, further comprises:

a pair of lateral masks, are flexible and connected to edges on both sides of the cover to assist in covering the user's eyes.

14. The light-shielding face mask according to claim 13, wherein the angle between each of the pair of lateral masks and the cover is greater than 90 degrees.

15. The light-shielding face mask according to claim 13, wherein each of the pair of lateral masks has a hole to allow the temples of glasses worn by the user to pass through.

16. The light-shielding face mask according to claim 15, wherein a width of the end of the hole relatively far away from the edge of the cover is not greater than a width of the end of the hole relatively close to the cover.

* * * * *